(12) United States Patent
Laxton et al.

(10) Patent No.: US 8,508,375 B2
(45) Date of Patent: Aug. 13, 2013

(54) COMPARATIVE PRESSURE MONITORING INSTRUMENT

(75) Inventors: Nigel Laxton, Mt. Hawthorn (AU); Henry Kroker, Osborne Park (AU)

(73) Assignee: Structural Monitoring Systems Ltd., Osborne Park, Western Australia (AU)

( * ) Notice: Subject to any disclaimer, the term of this patent is extended or adjusted under 35 U.S.C. 154(b) by 308 days.

(21) Appl. No.: 12/744,139

(22) PCT Filed: Nov. 21, 2008

(86) PCT No.: PCT/AU2008/001722
§ 371 (c)(1), (2), (4) Date: Jul. 20, 2010

(87) PCT Pub. No.: WO2009/065174
PCT Pub. Date: May 28, 2009

(65) Prior Publication Data
US 2010/0283621 A1    Nov. 11, 2010

(30) Foreign Application Priority Data
Nov. 21, 2007  (AU) ................................ 2007906375

(51) Int. Cl.
*G08B 21/00* (2006.01)
(52) U.S. Cl.
USPC ................................. 340/626; 340/611; 73/37
(58) Field of Classification Search
USPC ...................... 340/626, 611, 614, 606; 73/37, 73/170.14; 137/557
See application file for complete search history.

(56) References Cited

U.S. PATENT DOCUMENTS

| | | | |
|---|---|---|---|
| 5,770,794 A | 6/1998 | Davey | |
| 6,121,883 A * | 9/2000 | Hatsir | 340/584 |
| 6,539,776 B2 | 4/2003 | Davey | |
| 6,591,661 B2 | 7/2003 | Davey | |
| 6,715,365 B2 | 4/2004 | Davey | |
| 6,720,882 B2 * | 4/2004 | Davey | 340/611 |
| 6,973,375 B2 * | 12/2005 | Brodeur et al. | 700/282 |
| 2002/0029614 A1 | 3/2002 | Davey | |
| 2002/0092355 A1 | 7/2002 | Davey | |

FOREIGN PATENT DOCUMENTS

| | | |
|---|---|---|
| WO | WO 94/27130 A | 11/1994 |
| WO | WO 01/98746 A | 12/2001 |
| WO | WO 02/086437 A | 10/2002 |
| WO | WO 2007/112511 A | 10/2007 |
| WO | WO 2007/115363 A | 10/2007 |
| WO | WO 2007/128053 A | 11/2007 |
| WO | WO 2008/067586 A | 6/2008 |

* cited by examiner

*Primary Examiner* — Toan N Pham
(74) *Attorney, Agent, or Firm* — Frommer Lawrence & Haug, LLP; Ronald R Santucci

(57) ABSTRACT

A comparative pressure monitoring instrument (10) houses a switch (14) having first and second ports (18) and (20), and a high flow impedance 16. The ports (18) and (20) are in fluidal communication with a first pressure source (72) and a second pressure source (82) respectively. The impedance (16) is coupled (i.e. shunted) across the switch ports (18) and (20) and the first and second pressure sources (72, 82). The switch (14) switches between a first state characterised by a pressure differential across the impedance (16) being less than a preset level and a second state characterised by the pressure differential across the impedance (16) being equal to or greater than the preset difference. Any difference in pressure between the sources (72) and (82) will cause an air/gas flow through the impedance (16) and thus a pressure drop across the impedance (16).

21 Claims, 3 Drawing Sheets

COMPARATIVE PRESSURE MONITORING INSTRUMENT

This application is a 371 of PCT/AU2008/001722 filed on Nov. 21, 2008, published on May 28, 2009 under publication No. WO 2009/065174 A and claims priority benefits of Australian Patent Application No. 2007906375 filed Nov. 21, 2007, the disclosure of which is hereby incorporated by reference.

FIELD OF THE INVENTION

The present invention relates to a comparative pressure monitoring instrument and in particular, but not exclusively, for the monitoring of structural integrity.

BACKGROUND OF THE INVENTION

Applicant has devised numerous techniques and devices for monitoring the integrity of structures such as air craft components and bridges by monitoring pressure or fluid flow between a reference pressure and a cavity. Examples of such devices and systems are set out in the following patents:
U.S. Pat. No. 5,770,794; U.S. Pat. No. 6,539,776; U.S. Pat. No. 6,591,661; and U.S. Pat. No. 6,715,365.

The present invention represents a further development by Applicant in the field of structural integrity and structural health monitoring.

It is to be understood that, if any prior art publication is referred to herein, such reference does not constitute an admission that the publication forms a part of the common general knowledge in the art, in Australia or any other country.

In the claims of this specification of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

SUMMARY OF THE INVENTION

In one aspect of the present invention there is provided a comparative pressure monitoring instrument comprising:
a switch disposed in the housing and having a first switch port configured for fluidal communication with a first pressure source and a second switch port configured for fluidal communication with a second pressure source;
a high fluid flow impedance disposed in the housing and coupled across the first and second switch ports and in fluidal communication with the first and second pressure sources;
the switch being arranged to switch between a first state and a second state, the first state characterised by a pressure differential across the high fluid flow impedance being less than a preset difference and the second state being characterised by the pressure differential being equal to or greater than the preset difference.

The instrument may further comprise first and second connection ports supported on or by the instrument housing wherein the first and second switch ports are in fluid communication with the first and second connection ports respectively and facilitate fluidal coupling with the first and second pressure sources.

The instrument may further comprise a first conduit extending between the first switch port and the first connection port and a second conduit extending between the second switch port and a second connection port. In this embodiment, the high fluid flow impedance is connected to each of the first conduit and a second conduit.

In one embodiment, the switch is configured in a manner wherein the preset difference is variable. In one form, the preset difference is varied manually by a user, but in an alternate form, the preset difference is varied electronically.

Alternately, or additionally, in a further embodiment of the instrument, the high fluidal flow impedance is arranged to be variable. This may be achieved for example by providing a plurality of different high fluid flow impedances and selectively connecting and disconnecting the impedances between the first switch port and the second switch port.

The instrument may further comprise an alarm system coupled to the switch, the alarm system configured to enter: an alarm state when the switch is in the second state; and, a non-alarm state when the switch is in the first state.

The alarm system may be further configured to operate in one of a plurality of selectable modes, one of the modes being a latching mode wherein if the alarm system enters the alarm state, the alarm system is maintained in the alarm state irrespective of any change in state of the switch.

A second of the modes is a non-latching mode wherein the alarm system is configured to switch between the alarm state and the non-alarm state when the switch switches between the second state and the first state respectively.

The alarm system may further comprise a sensory alarm operable to emit a sensory alarm when the alarm system is in the alarm state.

A second aspect of the present invention provides a remote monitoring system comprising:
a plurality of instruments according to the first aspect of the present invention;
a pressure source in fluid communication with the first input of each instrument; and,
a transceiver;
wherein the instruments are coupled to the transceiver and wherein when a switch of one of the instruments changes state the transceiver transmits a signal to a remote location, the signal containing information indicative of the instrument pertaining to the switch which changed state.

The remote monitoring system may comprise for each instrument an alarm system coupled to the switch, the alarm system configured to enter: an alarm state when the switch is in the second state; and, a non-alarm state when the switch is in the first state, wherein the alarm system of each of the instruments is coupled to the transceiver and wherein when one of the alarm systems enters an alarm state the transceiver transmits a signal to the remote location, the signal containing information indicative of the alarm system entering the alarm state.

In the remote monitoring system each alarm system may be configured to operate in one of a plurality of selectable modes, one of the modes being a latching mode wherein if an alarm system enters the alarm state, that alarm system is maintained in the alarm state irrespective of any change in state of the switch.

A second of the modes may be a non-latching mode wherein the alarm systems are configured to switch between the alarm state and the non-alarm state when its corresponding switch switches between the second state and the first state respectively.

In the remote monitoring system one of the switch ports of each instrument may be coupled to the pressure source via a common conduit.

The remote monitoring system may comprise a first valve between the common conduit and the pressure source.

The remote monitoring system may comprise a plurality of switch port valves wherein respective switch port valves are disposed in fluidal communication between each of the switch ports coupled to the pressure source and the common conduit.

The remote monitoring system may comprise a bleed valve at one end of the common conduit.

The valves may be coupled to the transceiver wherein the valves can be selectively opened or closed via signals received by the transceiver.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

Figure 1:
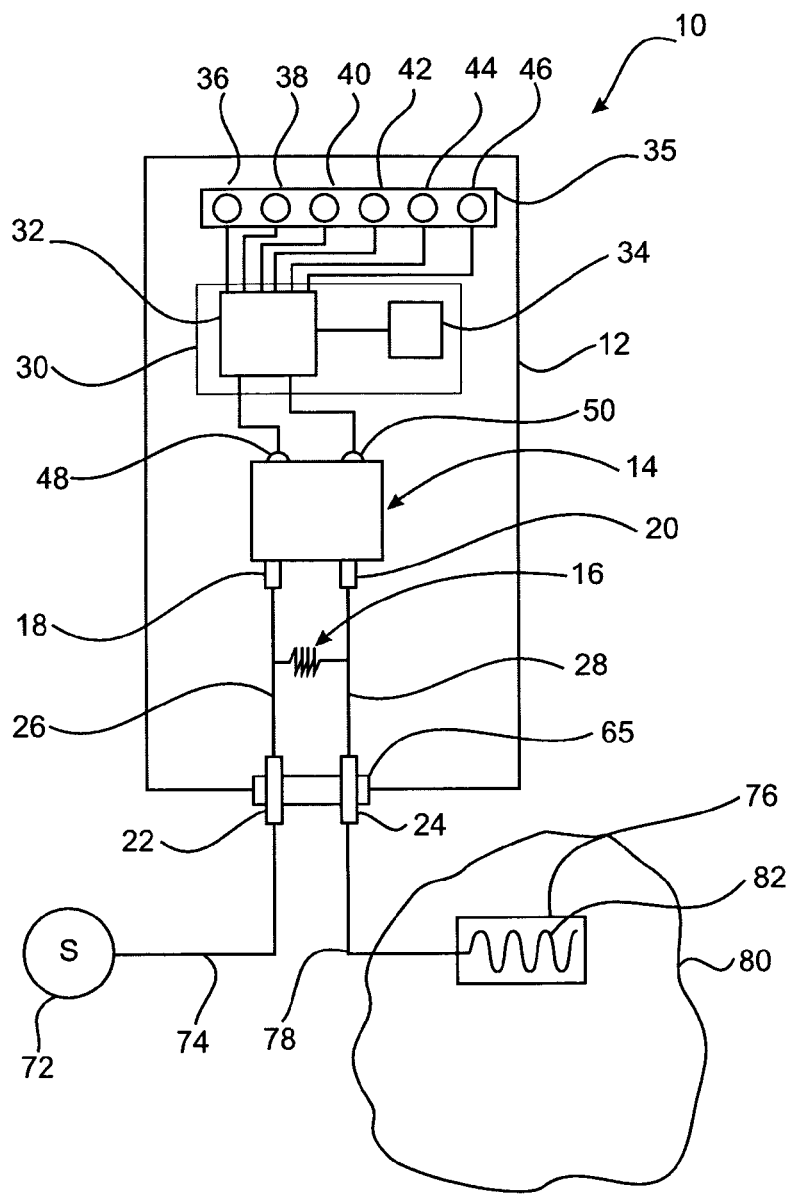
FIG. 1 is a schematic representation of an embodiment of the comparative pressure monitoring instrument in accordance with the present invention.

Referring to the accompanying drawings and in particular FIG. 1, an embodiment of a comparative pressure monitoring instrument 10 in accordance with the present invention comprises an instrument housing 12, typically in the form of a rectangular switch box made from plastics material which houses a switch 14 having first and second ports 18 and 20, and a high flow impedance 16. As explained in greater detail below, the ports 18 and 20 are configured for fluidal communication with a first pressure source 72 and a second pressure source 82. The expression "pressure source" is to be interpreted broadly to include a positive pressure source or a negative source relative to ambient pressure and may comprise: a device or machine that generate relative positive or negative (i.e. vacuum) pressures; or, a cavity, enclosure or body holding air or another gas at a pressure different to ambient pressure.

The impedance 16 is coupled (i.e. shunted) across the switch ports 18 and 20 and is also arranged to be in fluidal communication with the first and second pressure sources 72, 82.

The switch 14 switches between a first state characterised by a pressure differential across the impedance 16 being less than a preset level and a second state characterised by the pressure differential across the impedance 16 being equal to or greater than the preset difference. It will be appreciated that the pressure differential (i.e. pressure drop) across the impedance 16 is dependent on the difference in pressure between the source 72 and source 82. Any difference in pressure between the sources 72 and 82 will cause an air/gas flow through the impedance 16 and thus a pressure drop across the impedance 16.

In the illustrated embodiment, the first and second ports 18 and 20 are in fluidal communication with first and second connection ports 22 and 24 respectively. The connection ports 22 and 24 are supported by or on the instrument housing 12. A first conduit 26 provides fluid communication between the switch port 18 and the connection port 22, while a second conduit 28 provides fluid communication between the switch port 20 and the connection port 24. The impedance 16 is connected to and between the conduits 26 and 28 so as to effectively be shunted across the switch ports 18 and 20.

The switch 14 may be in the form of a diaphragm switch which is configured so that the difference in pressure across the impedance 16 required to cause a change in state of the switch can be variable. For example, the switch 14 may be configured so that a user is able to vary this difference in pressure required to cause a change in state of the switch either incrementally or continuously from say 0.5 kPa to 7 kPa. The setting of this difference may be performed at the time of assembly of the instrument 10 and subsequently fixed, or alternately a user may be able to vary the difference after assembly of the instrument 10 for example by accessing an adjustment mechanism such as screw of the switch 14 on, or through an opening in, the housing 12. However a more sophisticated switch 14 may be used in which the difference can be varied electronically, either by use of hardware or software or both.

The instrument 10 also comprises an alarm system 30 to which the switch 14 is electrically connected. The alarm system 30 is configured to enter an alarm state when the switch 14 is in its second state, and a non-alarm state when the switch is in its first state, depending on its mode of operation as explained in greater detail below. The alarm system 30 includes an alarm circuit 32 that may comprise a plurality of electronic components including integrated circuits and programmable devices, and a display 34. A terminal block 35 having a plurality of terminals 36, 38, 40, 42, 44 and 46 is supported on and accessible externally of the housing 12, with each of the terminals 36-46 being electrically connected with the alarm system 30 and in particular the alarm circuit 32.

Looking at some of the components of the instrument 10 in more detail, the switch 14 may comprise an off the shelf pressure or vacuum switch that switches between first and second states when a pressure or vacuum across the impedance 16 equals or exceeds a preset (or user variable) level. The switch 14 has a pair of electrical contacts 48 and 50 that are electrically coupled with the alarm system 30. When the switch 14 is in one state, a short circuit exists between the contacts 48 and 50 whereas when the switch 14 is in the other state, an open circuit exists between the contacts 48 and 50.

Figure 2:
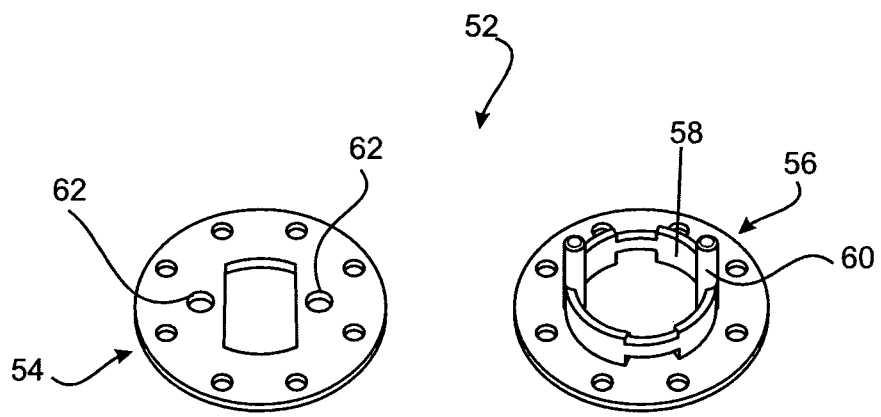
FIG. 2 is a representation of the spindle in an unassembled condition used in the instrument.
Figure 3:
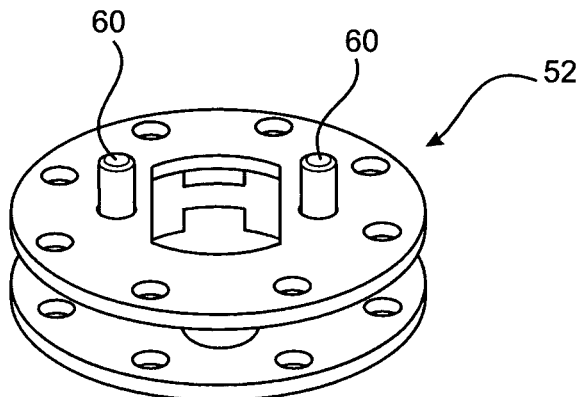
FIG. 3 is a representation of the spindle shown in FIG. 2 when in an assembled condition.

The impedance 16 is in the form of a length of small bore tubing (which may be referred to as a "high impedance tube"). In one embodiment the tubing may have a length in the order of 3.2 m and a bore diameter of 0.61 mm. The high impedance tube is wound on a spindle 52 (see FIGS. 2 and 3). The spindle 52 comprises of two separate components, a first component 54 in the form of a plate and a second component 56 in the form of plate provided with a circumferential wall 58 extending upright from the plate. The wall 58 forms a hub in the assembled spindle about which the high impedance tube is wound. Also extending axially at diametrically opposed locations from the circumferential wall 58 is a pair of pins 60. The pins 60 pass through holes 62 formed on the first component 54. The pins 60 subsequently pass through corresponding holes formed in a circuit board 64 (see FIG. 4). Pins 60 are retained on the circuit board 64 by use of clips.

The switch 14 and the spindle 52 are mounted on opposite sides of the circuit board 64. Opposite ends of the high impedance tube pass around opposite sides of the circuit board 64 and are inserted into holes (not shown) formed in the conduits 26 and 28. Each conduit 26 and 28 is in the form of a length of tube having a square cross section and formed with an internal bore of a diameter in the order of 3 mm.

The connectors 22 and 24 are integrally formed as a one piece moulding which also comprises a body 65 shaped and configured to allow easy coupling and connection with the housing 12. For example the body may comprise a central circumferential groove in which upper and lower shells of the housing are seated.

Figure 4:
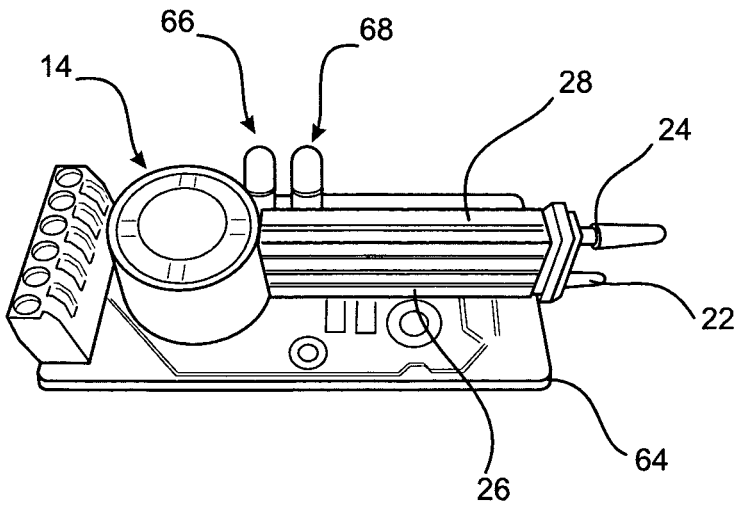
FIG. 4 is a representation of a circuit board and various components incorporated in the instrument.

Referring to FIG. 4, the display 34 comprises a red LED 68. The LED 68 is coupled to the circuit 32 so that when the alarm system 30 is in the alarm state the red LED 68 is ON. When the alarm system 30 is in the non-alarm state the red LED 68 is OFF. The LED 68 is visible on or through the housing 12.

A green power indicator LED 66 is also provided in the instrument 10. The green LED 66 is illuminated when correct power is supplied to the instrument 10.

The electrical connections between the terminal block 35 and the alarm circuit 32 are as follows. Terminal 36 is a power input terminal (typically 9-36 volts DC) to the instrument 10. Terminal 38 is an electrical ground terminal. Terminal 40 is a reset/mode select terminal (abbreviated as RST terminal). Connection 42 is a normally open alarm relay terminal. Connection 44 is a common alarm relay terminal, and connection 46 is a normally closed alarm relay terminal.

The alarm system 30 is able to operate in a plurality of modes and in particular a latching mode and a non-latching mode by appropriate coupling of various terminals. In the latching mode, if the alarm state is entered, this state is held until the instrument 10 is reset. That is, even if the switch 14 were to change state the alarm system 30 would still indicate an alarm state (i.e. the red LED 68 would remain illuminated). In the non-latching mode, the output of the alarm system 30 follows the alarm state. That is, the alarm system 30 switches between the alarm state and the non-alarm state substantially synchronously with the switch 14 switching between the second state and the first state.

When power is initially supplied to the instrument 10, the instrument enters a start up mode for a predetermined period of time, such as for 30 seconds. Assume that the first switch port 18 is connected to a pressure source 72 via a conduit 74 connected with the first connection port 22; and a sensor pad 76 is connected to the second switch 20 via a conduit 78 and connection port 24. The sensor pad 76 may be applied to the surface of a structure 80 which has been monitored. The sensor pad 76 is provided with a channel or groove 82 which forms a cavity or space against the surface of the structure 80. This cavity or space is the pressure source coupled in the switch port 20.

The start up period provides time for stabilization of the pressure source 72 and allows any electrical transients to pass. It will be appreciated, assuming there is no leak in the system and in particular the sensor 76 during initial stabilisation, that the pressure will be substantially equalised between the source 72 and the cavity formed by sensor 76 by a flow of air/gas through impedance 16. During this period, the alarm system 30 may be arranged to cause the green power LED 66 to flash.

Before or during the start up mode, the mode of the alarm system 30 may be selected. The latching mode is selected by leaving the RST terminal 40 floating (i.e. disconnected) during the entire mode selection and start up period. As previously described, in this mode, whenever the alarm system 30 is in the alarm state, the alarm state will be maintained or latched ON irrespective of any change in the state of the switch 14.

The latching mode can be cleared by connecting the RST terminal 40 and the ground terminal 38 together after the alarm condition is removed. If the alarm state is still present when reset, i.e. a pressure difference across the impedance 16 is more than the preset difference so that the switch 14 is in the second state, the alarm system 30 will again indicate the alarm state and will latch ON. Resetting of the alarm system may be performed manually by a reset switch (not shown) connected across the terminals 40 and 38 or electronically by control equipment. Further, the alarm system 30 may be operable so that when in the latching mode, the green (i.e. power indicator) LED 66 flashes every few seconds (for example every 3 seconds).

The instrument 10 can be configured so that the alarm system 30 remembers the last alarm state when it is powered down for a short period of time. Thus, for example if the instrument 10 is powered down or turned off when the alarm system 30 is in the alarm state, the instrument 10 will retain the alarm state when powered up.

Again, this can be reset by connecting the RST terminal 40 to the ground terminal 38 during normal operation.

The non-latching mode is selected by having the RST terminal 40 and the ground terminal 38 connected during the start up/mode selection period. In this mode, whenever an alarm state is entered, the red LED 68 will be illuminated, and whenever the alarm system 30 enters the non-alarm state, the red LED 68 is extinguished.

The instrument 10 may have a variable delay between removing the alarm state and the instrument equalising before the alarm state disables. The RST terminal 40 does not have any function in this mode. When the instrument 10 is in the non-latching mode the power LED 68 may be lit continuously as an indication thereof.

The instrument 10 is further configured so that if the mode cannot be determined at start up, the instrument will enter an error mode. This will cause the alarm LED 68 to toggle ON/OFF every one second. If the instrument 10 is in this state, proper operation may be restored by turning power to the instrument 10 OFF and then ON again, after setting the mode (RST pin) correctly and maintaining it.

The instrument 10 may be configured so that when the alarm state is entered, it remains in the state for a selected interval of time, for example one second regardless of the mode selected. In the latching mode, resetting of the instrument 10 during this period after the alarm state is initially entered will have no effect. Rather, resetting needs to occur after this interval. In the non-latching mode, the output will be maintained for a minimum period for example one second, regardless of the alarm state time.

The instrument 10 is further configured so that if the alarm state is maintained whilst the alarm system 30 is in the latching mode, and the RST terminal 40 is held low (i.e. grounded) the red alarm LED 68 will flash OFF and immediately go ON again every one second until the reset condition or the alarm state is removed.

The state of the alarm system 30 in addition to being output to the LED 68 is also output to the terminals 42, 44 and 46. More particularly, when the alarm system 30 is in the alarm state, a connection is made by the alarm circuit between the terminals 42 and 44, while a connection is made between the terminals 44 and 46 when the alarm system 30 is in the non-alarm state.

The instrument 10 provides a simple and inexpensive device to provide a binary (i.e. yes/no) indication of an impending failure of the structure 80 as explained below. Assume the source 72 is a vacuum source providing a vacuum of 20 kPa relative to atmospheric pressure. The sensor pad 76 is adhered or sealed onto the structure 80 and is formed with a gallery 82 that forms a cavity against the surface of the structure 80. Assuming that there is no crack or fracture in the structure 80 that traverses the gallery 82 to the extent that it creates a path to ambient pressure, then it is expected that after initial stabilisation, that the vacuum level at the inputs 18 and 20 will be substantially the same, so there is no pressure drop across the impedance 16, or at least any pressure drop is less than the predetermined difference required in order for the switch 14 to enter the second state. In this condition, irrespective of whether or not the alarm system 30 is in the latched or non-latched mode, the alarm system 30 is in a non-alarm state. If however a fracture occurs in the surface of the structure 80 that traverses the gallery 82 and extends so as to create a path to ambient pressure, the vacuum condition under the sensor 76 will differ from the vacuum level provided by the source 72. Accordingly there will be a flow of air through the impedance due to the pressure differential across the impedance. Assuming this to be greater than the predetermined difference required for tripping the switch 14, the switch 14 will switch to the second state. This change in state is detected by the alarm system 30 which will enter the alarm state causing the red LED 68 to illuminate.

Figure 5:
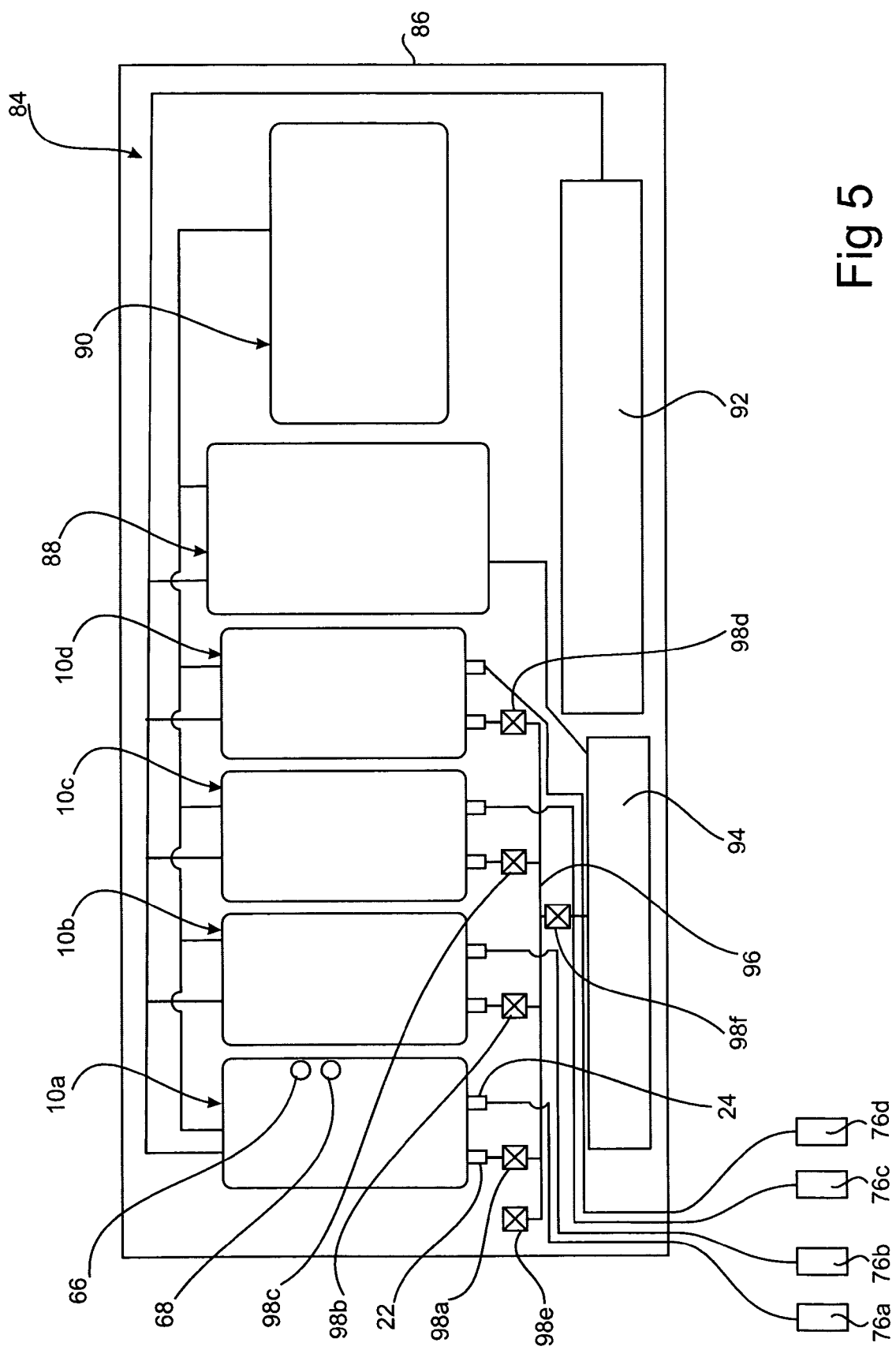
FIG. 5 is a schematic representation of a remote unit comprising a plurality of the instruments shown in FIGS. 1-4; and, FIG. 6 is a schematic representation of a sensor arrangement that may be coupled to the instrument.

The instrument 10 lends itself to remote sensing applications for monitoring structures such as bridges, oil rigs and other large mechanical structures. In this regard FIG. 5 depicts a remote sensing unit 84 comprising a housing 86 that contains four instruments 10a, 10b, 10c and 10d each identical to the instrument 10 described above and illustrated in FIGS. 1-4. The unit 84 further comprises a vacuum pump 88, a controller module 90, a power supply 92 and a tank 94. The controller module 90 includes a transceiver to allow wireless communication with a remote location.

The power source 92 is typically in the form of rechargeable batteries and is electrically connected to the controller 90, the vacuum pump 88, and each of the instruments 10a-10d. A photovoltaic panel (not shown) may be provided to recharge the power supply 92. The vacuum pump 88 operates to evacuate the tank 94 and maintain the tank 94 at a predetermined vacuum level or range relative to ambient atmosphere, for example between approximately 15-20 kPa below ambient pressure. In this regard a pressure switch (not shown) similar to the switch 14 may be coupled between the vacuum pump 88 and tank 94 to maintain the tank pressure 94 at a particular level or within a particular range. For example the switch could operate to turn the pump 88 ON if pressure sensed in the tank 94 is greater than −15 kPa and to turn the pump OFF if the pressure in tank 94 is sensed to be less than −20 kPa thereby maintaining the system vacuum level at say approximately between −20 kPa and −15 kPa.

A common vacuum conduit 96 couples the tank 94 to the first connection 22 and thus the first switch port 18 of each of the instruments 10a-10d. The second connection port 24 and thus the second switch port 20 of each of the instruments 10a-10d is connected by respective conduits to corresponding sensors 76a-76d. The sensors 76a-76d may be placed at different locations on a structure(s) being monitored. When the difference in pressure between the first and second input ports 18 and 20 (i.e. pressure drop across the impedance 16) of any one instrument 10a-10d exceeds the predetermined difference causing the corresponding switch 14 to enter its second state, the corresponding alarm system 30 will enter the alarm state. Using connections to the terminals 42, 44 and 46 the controller module 90 will sense the alarm state and causes the transceiver to transmit a signal to a remote location indicating that the alarm state of a particular instrument has been entered. This may be by any communication system or technology including by way of radio, sending a SMS message to a mobile phone, or sending an email to a particular email address. Thus the unit 84 may be installed and essentially left to monitor the integrity of a structure and send messages when an alarm state of any one of the instruments has been entered.

A number of valves 98a, 98b, 98c, 98d, 98e and 98t may be placed in the conduit 96. In particular, the valves 98a, 98b, 98c and 98d are plumbed between the connection ports 22 of each of the instruments 10a-10d respectively and the conduit 96. These valves can be individually opened or closed via signals received by the transceiver 90 to isolate the instruments 10a-10d. This isolation may be conducted sequentially or simultaneously for any number of instruments. This enables both individual testing of the instruments 10a-10d and also allows a particular instrument 10 to be isolated from the tank 94 in the event that its corresponding sensor is located over a crack and is therefore sucking in air and otherwise reducing the vacuum level in the tank 94. The valve 98e can be turned on and off to allow bleeding/venting of the conduit 96. The valve 98t can also be operated to isolate the tank 94 from all of the instruments 10a-10d and is also operated during testing procedure for the unit 84.

An example of the on site testing and operation of the unit 84 is set out below. Assume that initially the instruments 10a-10d are powered ON and settled and each of the valves 98a-98e and 98t are closed. Sensor 76a is installed at a required test site and connected to the connection port 24 of the instrument 10a. Assuming that the pump 88 has been operated and a tank 94 evacuated to the required vacuum level, the valves 98t and 98a are now opened. The alarm system of the instrument 10a should enter the alarm state indicated by illumination of the red LED 68 for a period of say 10-20 seconds, and then extinguish, indicating that the alarm system has entered the non-alarm state. Such a sequence of operation of the alarm system is indicative of a successful installation. The time period for which the alarm system is initially in the alarm state is dependent upon the distance of the instrument 10a from the corresponding sensor 76a and the magnitude of the source vacuum. If the alarm system of instrument 10a remains in the alarm state, there is a leakage in the sensor installation or ducting connections or the flow restrictor 16 blocked. In this event, the instrument 10a can be isolated by closing the valve 98a. This procedure may be repeated for each of the instruments 10b, 10c and 10d. Filters may be installed between the sensor 76 and instrument 10 to minimize the risk of blockage of a flow restrictor 16.

The cyclic response of an instrument 10 when first connected to the vacuum source comprising the pump 88 and the tank 94 gives integrity assurance of the unit 84.

Figure 6:
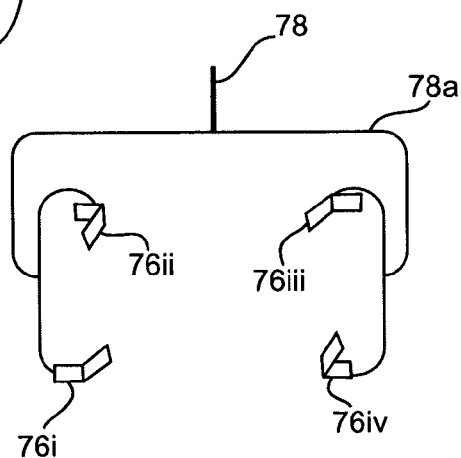

Now that embodiments of the invention have been described in detail it will be apparent to those skilled in the relevant arts that numerous modifications and variations may be made without departing from the basic inventive concepts. For example the illustrated instrument 10 is shown as comprising an alarm circuit 32. However this circuit may be integrated with or part of a larger overall control circuit for the instrument 10 or may indeed be implemented in software stored in a memory device which is accessed by a processing unit. Also, in the embodiment depicted in FIG. 1 the instrument 10 is shown as being coupled via a conduit 78 to a sensor pad 76. However multiple sensor pads may be coupled to the conduit 78 and thus the input port 20 via the intervening connection port 24 and conduit 28. An example of this is illustrated in FIG. 6 which depicts four sensors 76*i*, 76*ii*, 76*iii* and 76*iv* coupled via a branch conduit 78*a* to the conduit 78. Such an arrangement of multiple sensors may also of course be applied to the unit 84 illustrated in FIG. 5.

All such modifications and variations together with others that would be obvious to a person of ordinary skill in the art are deemed to be within the scope of the present invention the nature of which is to be determined from the above description.

The invention claimed is:

1. A comparative pressure monitoring instrument comprising:
    a housing;
    a switch disposed in the housing and having a first switch port and a second switch port;
    a first conduit extending from the first switch port and through the housing, the first conduit arranged to enable fluidic coupling between the first port and a first pressure source external of the housing;
    a second conduit extending from the second switch port and through the housing, the second conduit arranged to enable fluidic coupling between the second port and a second pressure source external of the housing;
    a high fluid flow impedance disposed in the housing and coupled across the first and second conduits;
    the switch being arranged to switch between a first state and a second state, the first state characterised by a pressure differential across the high fluid flow impedance being less than a preset difference and the second state being characterised by the pressure differential being equal to or greater than the preset difference.

2. The instrument according to claim 1 further comprising first and second connection ports supported by the housing wherein the first and second conduits are in fluid communication with the first and second connection ports respectively.

3. The instrument according to claim 1 wherein the switch is configured in a manner wherein the preset difference is variable.

4. The instrument according to claim 3 wherein the preset difference is varied manually by a user.

5. The instrument according to claim 3 wherein the preset difference is varied electronically.

6. The instrument according to claim 1 wherein the high fluid flow impedance is arranged to be variable.

7. The instrument according to claim 6 wherein the high fluid impedance is one of a plurality of high fluid flow impedances and wherein the plurality of high fluid flow impedances are arranged to be selectively connected and disconnected between the first and second switch ports.

8. The instrument according to claim 1 further comprising an alarm system disposed in the housing and coupled to the switch, the alarm system configured to enter: an alarm state when the switch is in the second state; and, a non-alarm state when the switch is in the first state.

9. The instrument according to claim 8 wherein the alarm system is configured to operate in one of a plurality of selectable modes, one of the modes being a latching mode wherein if the alarm system enters the alarm state, the alarm system is maintained in the alarm state irrespective of any change in state of the switch.

10. The instrument according to claim 9 wherein a second of the modes is a non-latching mode wherein the alarm system is configured to switch between the alarm state and the non-alarm state when the switch switches between the second state and the first state respectively.

11. The instrument according to claim 8 further comprising a terminal block supported on, and accessible externally of, the housing; the terminal block being electrically connected to the alarm system.

12. The instrument according to claim 11 wherein the terminal block has a plurality of terminals and wherein at least one of the terminals is arranged to couple with an external electrical power source to provide electrical power to the alarm system.

13. A remote monitoring system comprising:
    a plurality of instruments according to claim 1;
    a pressure source in fluid communication with the first input of each instrument; and,
    a transceiver;
    wherein each of the instruments is coupled to the transceiver and wherein when a switch of one of the instruments changes state the transceiver transmits a signal to a remote location, the signal containing information indicative of the instrument pertaining to the switch which changed state.

14. The remote monitoring system according to claim 13 further comprising for each instrument an alarm system coupled to the switch for that instrument, the alarm system configured to enter: an alarm state when its corresponding switch is in the second state; and, a non-alarm state when its corresponding switch is in the first state, wherein the alarm system of each of the instruments is coupled to the transceiver and wherein when one of the alarm system enters an alarm state the transceiver transmits a signal to the remote location, the signal containing information indicative of the alarm system entering the alarm state.

15. The remote monitoring system according to claim 14 wherein each alarm system is configured to operate in one of a plurality of selectable modes, one of the modes being a latching mode wherein if the alarm system enters the alarm state, the alarm system is maintained in the alarm state irrespective of any change in state of its corresponding switch.

16. The remote monitoring system according to claim 15 wherein a second of the modes is a non-latching mode wherein the alarm system is configured to switch between the alarm state and the non-alarm state when the switch switches between the second state and the first state respectively.

17. The remote monitoring system according to claim 13 wherein one of the switch ports of each instrument is coupled to the pressure source via a common conduit.

18. The remote monitoring system according to claim 17 comprising a first valve between the common conduit and the pressure source.

19. The remote monitoring system according to claim 17 comprising a plurality of switch port valves wherein respective switch port valves are disposed in fluidal communication between each of the switch ports coupled to the pressure source and the common conduit.

20. The remote monitoring system according to claim 17 comprising a bleed valve at one end of the common conduit.

21. The remote monitoring system according to claim 17 wherein the valves are coupled to the transceiver wherein the valves can be selectively opened or closed via signals received by the transceiver.

* * * * *